(12) United States Patent
Konopacki et al.

(10) Patent No.: US 10,731,849 B2
(45) Date of Patent: Aug. 4, 2020

(54) APPARATUS AND METHOD FOR WELDING A WATERWALL PANEL

(71) Applicant: GENERAL ELECTRIC TECHNOLOGY GMBH, Baden (CH)

(72) Inventors: Ronald Francis Konopacki, Suffield, CT (US); Russell Brumfield, Cleveland, TN (US)

(73) Assignee: General Electric Technology GmbH, Baden (CH)

( * ) Notice: Subject to any disclaimer, the term of this patent is extended or adjusted under 35 U.S.C. 154(b) by 773 days.

(21) Appl. No.: 15/172,430

(22) Filed: Jun. 3, 2016

(65) Prior Publication Data

US 2017/0350588 A1 Dec. 7, 2017

(51) Int. Cl.
| | |
|---|---|
| *F22B 37/20* | (2006.01) |
| *B23K 13/02* | (2006.01) |
| *B23K 26/26* | (2014.01) |
| *C21D 9/50* | (2006.01) |
| *C21D 1/42* | (2006.01) |
| *F22B 37/10* | (2006.01) |

(Continued)

(52) U.S. Cl.
CPC .......... *F22B 37/201* (2013.01); *B23K 13/025* (2013.01); *B23K 26/26* (2013.01); *B23K 31/02* (2013.01); *C21D 1/42* (2013.01); *C21D 9/50* (2013.01); *F22B 37/04* (2013.01); *F22B 37/104* (2013.01); *H05B 6/101* (2013.01); *H05B 6/40* (2013.01); *B23K 2101/08* (2018.08); *B23K 2101/14* (2018.08); *C21D 2221/00* (2013.01); *C21D 2221/10* (2013.01); *Y02P 10/253* (2015.11)

(58) Field of Classification Search
CPC .............. B23K 13/025; B23K 2101/08; B23K 2101/14; B23K 26/26; B23K 31/02; H05B 6/101; H05B 6/40
USPC ........ 427/456, 427, 453, 455, 543; 219/609, 219/600, 601, 603, 617, 619, 621, 672
See application file for complete search history.

(56) References Cited

U.S. PATENT DOCUMENTS

| | | |
|---|---|---|
| 3,467,809 A | 9/1969 | Lorentz, Jr. |
| 4,505,763 A | 3/1985 | Sugihara et al. |
| (Continued) | | |

FOREIGN PATENT DOCUMENTS

| | | |
|---|---|---|
| DE | 10 2011 013 094 A1 | 9/2012 |
| JP | 2005337623 A | 12/2005 |
| WO | 2012/119676 A1 | 9/2012 |

OTHER PUBLICATIONS

International Search Report and Written Opinion issued in connection with corresponding PCT Application No. PCT/EP2017/062127 dated Aug. 9, 2017.

(Continued)

*Primary Examiner* — Dana Ross
*Assistant Examiner* — Joe E Mills, Jr.
(74) *Attorney, Agent, or Firm* — Fletcher Yoder, P.C.

(57) ABSTRACT

A waterwall panel welding apparatus is provided. The apparatus includes an inlet assembly, a welding assembly, an outlet assembly, and a heating system. The inlet assembly is for receiving a plurality of tubes. The welding assembly is for receiving the tubes from the inlet assembly and for allowing the tubes to be welded together to form a waterwall panel. The outlet assembly is for receiving the waterwall panel from the welding assembly. The heating system heats the tubes and operates via magnetic induction.

20 Claims, 6 Drawing Sheets

(51) Int. Cl.
    *B23K 31/02*     (2006.01)
    *F22B 37/04*     (2006.01)
    *H05B 6/10*     (2006.01)
    *H05B 6/40*     (2006.01)
    *B23K 101/14*     (2006.01)
    *B23K 101/08*     (2006.01)

(56) References Cited

U.S. PATENT DOCUMENTS

| | | | |
|---|---|---|---|
| 6,091,063 A | | 7/2000 | Woods |
| 6,162,509 A | * | 12/2000 | Cherico .................... C23C 4/02 |
| | | | 427/427 |
| 7,028,882 B2 | | 4/2006 | Kislovsky et al. |
| 8,713,794 B2 | | 5/2014 | Hartwig et al. |
| 2008/0000894 A1 | * | 1/2008 | Baarman ................ H05B 1/02 |
| | | | 219/601 |
| 2010/0300379 A1 | | 12/2010 | Itai et al. |
| 2012/0288638 A1 | * | 11/2012 | Baxter .................. H05B 6/107 |
| | | | 427/543 |

OTHER PUBLICATIONS

European Office Action for EP Application No. 17 726 881.0 dated Jan. 23, 2020; 5 pgs.

\* cited by examiner

APPARATUS AND METHOD FOR WELDING A WATERWALL PANEL

BACKGROUND

Technical Field

Embodiments of the invention relate generally to power generation and, more specifically, to an apparatus and method for welding a waterwall panel.

Discussion of Art

Many electrical power generation plants utilize steam generators to power turbines, which generate electrical power. Such plants typically use boilers to generate steam via waterwalls that capture thermal energy emitted by the combustion of a fuel in a combustion chamber. As it happens to be, many waterwalls are formed by metal tubes, herein also referred to as "waterwall tubes" and/or simply "tubes", welded together to form panels, herein after also referred to as "waterwall panels" and/or simply "panels", which often line the inner walls of a combustion chamber. During steam generation operations, the tubes of the panels are filled with water, thus enabling the waterwalls to function as heat exchangers by capturing/absorbing heat emitted by combusting the fuel and transferring the captured heat to the water.

Many waterwall panels are manufactured from metal alloys, e.g., T-91 and T-92, which are highly susceptible to cracking during and/or after the welding process, thus making such panels extremely difficult to fabricate/manufacture. In particular, the temperatures of tubes made from such alloys must often be tightly controlled during the welding process. Accordingly, the tubes of many waterwalls are preheated prior to being welded, and then heat treated after welding, in a process commonly referred to as a post weld heat treatment ("PWHT"), to temper the welds holding the tubes together.

Presently, many waterwall manufacturing processes preheat waterwall tubes via contact heaters, such as electrical resistance heaters and/or flame based heaters, e.g., gas torches; and PWHT via baking ovens. Contact heaters, however, heat the metal tubes from the surface inward. Thus, such heaters often heat waterwall tubes unevenly and/or take a long time to raise the internal temperatures of the tubes to the required welding temperature. Additionally, in most waterwall manufacturing processes, freshly welded waterwall panels must be transferred to a baking oven to complete the PWHT. Transferring the panels to the baking oven, however, inherently requires handling the panels prior to the PWHT, e.g., many waterwall manufacturing processes require freshly welded waterwall panels to be carried/transported to a baking oven prior to being tempered, which is typically conducted in a careful and deliberate manner to avoid cracking the non-tempered welds. Thus, in many waterwall manufacturing processes, the act of transferring the panels to a baking oven is often slow and time consuming. Further, many waterwall panel manufacturing processes require the panels to be baked within an oven in batches, which delays the average fabrication/cycle production time, i.e., the average time it takes to manufacture/fabricate a single panel.

What is needed, therefore, is an improved apparatus and method for welding a waterwall panel that reduces the amount of handling of the panel prior to undergoing PWHT, and/or the cycle production time of the waterwall panel.

BRIEF DESCRIPTION

In an embodiment, a waterwall panel welding apparatus is provided. The apparatus includes an inlet assembly, a welding assembly, an outlet assembly, and a heating system. The inlet assembly is for receiving a plurality of tubes. The welding assembly is for receiving the tubes from the inlet assembly and for allowing the tubes to be welded together to form a waterwall panel. The outlet assembly is for receiving the waterwall panel from the welding assembly. The heating system heats the tubes and operates via magnetic induction.

In another embodiment, a method of welding a plurality of tubes together to form a waterwall panel is provided. The method includes: longitudinally aligning the tubes; welding the tubes to each other to form the waterwall panel; and heating the one or more tubes via magnetic induction.

In yet another embodiment, a shaped inductive heater for heating one or more fins of a plurality of tubes used to form a waterwall panel is provided. The shaped inductive heater includes one or more raised portions and one or more wells for matchingly aligning with one or more valleys and one or more peaks of the tubes, respectively. The valleys are defined by the fins and the peaks are defined by one or more outer diameters of the tubes. The tubes are welded together via the fins to form the waterwall panel, and the shaped inductive heater heats the fins via magnetic induction.

DRAWINGS

The present invention will be better understood from reading the following description of non-limiting embodiments, with reference to the attached drawings, wherein below.

DETAILED DESCRIPTION

Reference will be made below in detail to exemplary embodiments of the invention, examples of which are illustrated in the accompanying drawings. Wherever possible, the same reference characters used throughout the drawings refer to the same or like parts, without duplicative description.

As used herein, the terms "substantially," "generally," and "about" indicate conditions within reasonably achievable manufacturing and assembly tolerances, relative to ideal desired conditions suitable for achieving the functional purpose of a component or assembly. As used herein, "electrically coupled," "electrically connected," and "electrical communication" mean that the referenced elements are directly or indirectly connected such that an electrical current may flow from one to the other. The connection may include a direct conductive connection, i.e., without an intervening capacitive, inductive or active element, an inductive connection, a capacitive connection, and/or any other suitable electrical connection. Intervening components may be present. As also used herein, the terms "upstream" and "down stream," describe the position and/or order of elements on, and/or stages of, an assembly line/conveyor system with respect to a direction that defines the order an object traveling through the assembly line/conveyor system encounters the elements and/or stages.

Additionally, as used herein, the term "fill" includes both fully and partially filling a containing object with a filling object. As also used herein, the term "heating-contact" means that the referenced objects are in proximity of one another such that heat/thermal energy can transfer between them. Additionally, the term "real time" means a level of processing responsiveness that a user senses as sufficiently immediate or that enables the processor to keep up with an external process.

Further, while the embodiments disclosed herein are described with respect to steam generators and boilers, it is to be understood that embodiments of the present invention are equally applicable to any device and/or process in which metal tubes and/or other objects must be preheated and/or undergo a PWHT process, e.g., tempering, as a result of being welded together.

Figure 1:
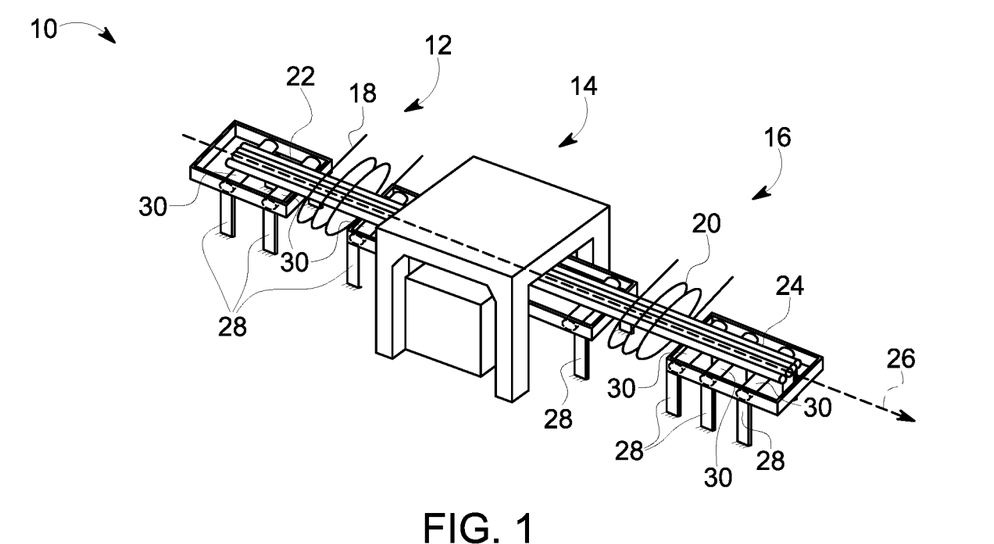
FIG. 1 is a perspective view of a waterwall panel welding apparatus that includes a heating system in accordance with an embodiment of the invention.
Figure 2:
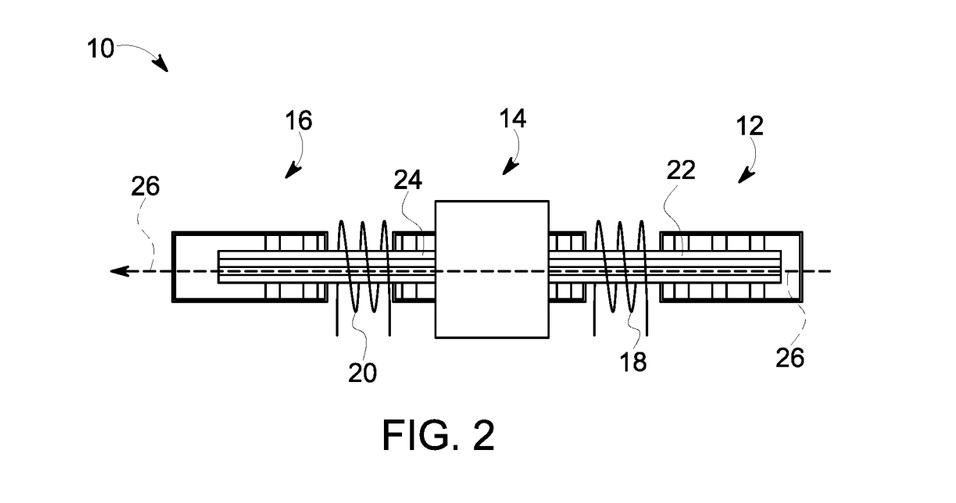
FIG. 2 is a top view of the waterwall panel welding apparatus and the heating system of FIG. 1.

Accordingly, referring to FIGS. 1 and 2, a waterwall panel welding apparatus 10, in accordance with an embodiment of the invention, includes an inlet assembly 12, a welding assembly 14, an outlet assembly 16, and a heating system 18, 20 that may include a preheating stage 18 and a PWHT stage 20. The inlet assembly 12 is configured to receive a plurality of tubes 22. The welding assembly 14 is configured to receive the tubes 22 from the inlet assembly 12, and is further configured to allow the tubes 22 to be welded together to form a waterwall panel 24. The waterwall panel 24 may be a high alloy panel, a low alloy panel, and/or other suitable panel/structure made from welded components. The outlet assembly 16 is configured to receive the waterwall panel 24 from the welding assembly 14. As will be appreciated, the heating system 18, 20 operates/heats via magnetic induction.

As also shown in FIGS. 1 and 2, the waterwall panel welding apparatus 10 may implement a conveyor/assembly line system, formed by the inlet assembly 12, the welding assembly 14, and the outlet assembly 16, that has a flow path (generally represented by arrow 26) in the direction from the inlet assembly 12 to the outlet assembly 16. In other words, in embodiments, the inlet assembly 12 is upstream of the welding assembly 14, while the outlet assembly 16 is downstream of the welding assembly 14.

The waterwall welding apparatus 10 may be of a twelve torch, four torch, or gantry design. As used herein, the term "twelve torch design" refers to a waterwall panel welding apparatus design wherein the welding assembly 14 provides for the ability to simultaneously weld multiple sites to combine independent tubes 22, i.e., tubes 22 not already forming part of an existing panel 24 or subpanel, into a single panel 24 fabrication, e.g., a welding apparatus capable of welding thirteen (13) tubes together via twelve (12) welding sites to form a single panel 24 and/or subpanel; the term "four torch design" refers to a waterwall panel welding apparatus design that provides for the ability to weld multiple subpanels into a larger panel 24; and the term "gantry design" refers to a waterwall panel welding apparatus design wherein the tubes 22 remain stationary during welding, as opposed to moving along a conveyor/assembly line 26, while a gantry moves over the tubes 22. As is to be appreciated, in embodiments where the heating apparatus 10 is of a gantry design, the heating system 18, 20 may be disposed on the gantry such that it moves with the gantry in relation to stationary tubes 22. Further, embodiments of the welding apparatus 10 may combine various features of the twelve torch, twelve torch, gantry, and/or other commonly used waterwall panel welding apparatus designs.

The inlet assembly 12 may form the beginning/start of the flow path/assembly line 26. As such, the inlet assembly 12 may include one or more rollers 28 supported by one or more supporting structures 30 so as to allow the tubes 22 to be longitudinally aligned into the shape of the panel 24 prior to being welded in the welding assembly 14. In embodiments, components of the heating system 18 may be disposed on/in the inlet assembly 12 so as to preheat the tubes 22 prior to being welded in the welding assembly 14.

The welding assembly 14 provides the necessary support, environment, and/or other equipment to facilitate welding of the tubes 22 to form the panel 24. The welding assembly 14 may also include supports and rollers (not shown) so as to allow the tubes 22 to enter the welding assembly 14 from the inlet assembly 12.

Similar to the inlet assembly 12, the outlet assembly 16 may include supports 28 and rollers 30 that allow the freshly welded panel 24 to leave the welding assembly 14. In embodiments, components of the heating system 20 may be disposed on/in the outlet assembly 16 so as to PHWT the tubes.

While embodiments of the inlet assembly 12, welding assembly 14, and outlet assembly 16 are described herein as utilizing supports 28 and rollers 30, it is to be understood that the inlet assembly 12, welding assembly 14, and/or outlet assembly 16 may utilize other structures capable of facilitating movement of the tubes 22 along the flow path/assembly line 26.

Figure 3:
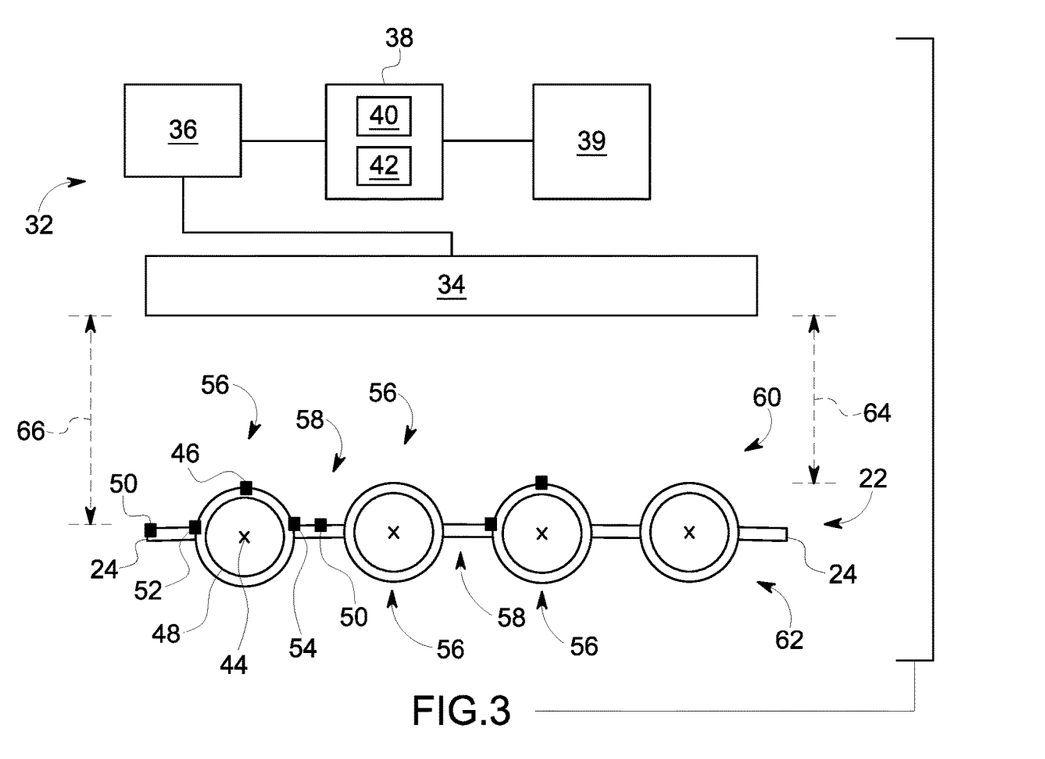
FIG. 3 is a diagram of the heating system of FIG. 1 and a waterwall panel in accordance with an embodiment of the invention.

Turning now to FIG. 3, a heating system 32, representative of the preheat stage 18 and/or the PWHT stage 20 of FIGS. 1 and 2, is shown in relation to a plurality of tubes 22. In embodiments, the heating system 32 may include a heating inductor 34, a power supply 36, a controller 38, one or more sensors 39, and may be configured to heat the tubes 22 via magnetic induction.

The power supply 36 may be in electronic communication with the heating inductor 34 so as to supply an electrical current, which in embodiments may be an alternating current ("AC"), that passes through the heating inductor 34 to generate a magnetic field.

The controller 38 may include at least one processor 40 and a memory device 42 that may store a welding application. The controller 38 may be in electronic communication with the power supply 36, and one or more power regulating devices (not shown), such that the controller 38 can manipulate/control the magnetic field generated by the heating inductor 34 via controlling/manipulating the flow of electricity through the heating inductor 34. In embodiments, the controller 38 may adjust the power supplied (electrical current) to the heating inductor 34 in an analog fashion. Thus, as will be appreciated, some embodiments of the controller 38 provide just enough power to the heating inductor 34 to maintain a particular temperature profile within the tubes 22.

The one or more temperature sensors 39 may be in electronic communication with the controller 38 and configured to sense/detect the temperature of the tubes 22 so as to form a real-time and/or near real-time control/feedback loop. As will be appreciated, the temperature sensors 39 may take the form of optical sensors, e.g., infrared ("IR") cameras, LASERS, thermacouples, and/or other types of temperature sensing devices.

As further shown in FIG. 3, each of the tubes 22 may include a longitudinal center axis 44, an outer diameter 46, and an inner diameter 48. One or more fins 50 may be attached to the outer diameter 46 at outer 52 and inner 54 joints. As will be appreciated, in embodiments, the tubes 22 may be welded together via the fins 50 so as to form the panel 24. While the tubes 22 are depicted as circular, it is to be understood that the tubes 22 may take other forms, e.g., squares, triangles, and/or other shapes capable of being welded together to form a larger object, e.g., a panel 24.

Prior to being welded together, the tubes 22 may be longitudinally aligned, i.e., the longitudinal center axes 44 are aligned, so that the tubes 22 form the shape of the panel 24 prior to actually being welded. As such, when the tubes 22 are longitudinally aligned, the fins 50 and the outer diameters 46 define/form peaks 56 and valleys 58, respectively, on both a first side 60 and a second side 62 of the pre-welded panel 24. As is to be understood, while the first 60 and the second 62 sides of the tubes 22/panel 24 are shown in FIG. 3 as being symmetrical, in other embodiments, the first 60 and the second 62 sides may be asymmetrical.

The heating inductor 34 is configured to apply a magnetic field to the tubes 22 so as to induce an electrical current within the tubes 22. In embodiments, the heating inductor 34 may be a straight bar inductor as shown in FIG. 3, or a coil inductor that wraps around the inlet 12 and/or the outlet 16 assemblies as shown in FIG. 1. Accordingly, the heating inductor 34 may be spaced apart from the outer diameters 46/peaks 56 of the tubes 22 and the fins 50/valleys 58 so as to define one or more gaps 64 and 66. As used herein, the gap 64 between the heating inductor 34 and the peaks 56 is referred to herein as the "tube gap," and the gap 66 between the heating inductor 34 and the valleys 58 is referred to herein as the "air gap". In embodiments, the tube gap 64 and the air gap 66 may be 0.25-1.5 inches and 0.25-1 inches, respectively.

As will be appreciated, magnetic induction provides for the non-contact heating of a paramagnetic material via the generation/inducement of an electrical current within the paramagnetic material resulting from an applied magnetic field. Accordingly, the magnetic field generated by the heating inductor 34 induces electrical eddy currents within the tubes 22, which in turn results in subsurface heating of the tubes 22. As will be appreciated, subsurface heating is more efficient than contact surface heating, e.g., gas torches, as less heat escapes the tubes 22.

The depth and/or intensity of the site of heating within the tubes 22 resulting from the magnetic field applied by the heating inductor 34 can be varied by varying the frequency of the electrical current passing through the heating inductor 34. For example, embodiments may utilize high frequencies, e.g., 50 kHz, to heat regions within the tubes 22 closes to the surface/outer diameter 46, and/or low-frequencies, e.g., 60 kHz to heat regions deep within the tubes 22, e.g., up to 3 mm (⅛") from the surface/outer diameter 46. Additionally, the heating inductor 34 may apply a static magnetic field over an extended period of time, e.g., five (5) seconds, and/or apply a series of magnetic pulses to the tubes 22, e.g., applying a series of magnetic pulses over a ten (10) second period, each pulse having a duration of one (1) second, and subsequent pulses spaced apart by a duration less than one (1) second. As will be appreciated, however, the period, duration of each pulse, and the duration between subsequent pulses may be varied in embodiments to achieve a desired temperature profile. Accordingly, in embodiments, the heating inductor 34 may heat the tubes 22 up to a temperature between and including 302° F. (150° C.) to 400° F. (200° C.) when utilized in the preheating stage 18, and/or between and including 1,292° F. (700° C.) to 1,445° F. (785° C.) when utilized in the PWHT stage 20.

The depth and/or intensity of the site of heating within the tubes 22 resulting from the magnetic field applied by the heating inductor 34 may also be varied by varying the tube gap 64 and/or the air gap 66. For example, in embodiments, the larger or smaller the gaps 64, 66, the less or the greater the magnetic coupling between the tubes 22 and the heating inductor 34, and the less or more heat generated within the tubes 22, respectively.

Figure 4:
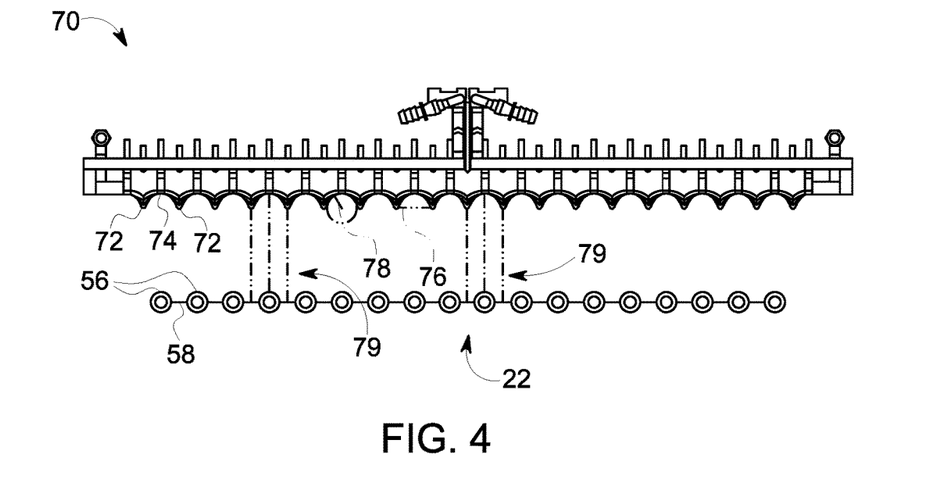
FIG. 4 is a diagram of a shaped inductive heater of the heating system of FIG. 1 in accordance with an embodiment of the invention.
Figure 5:
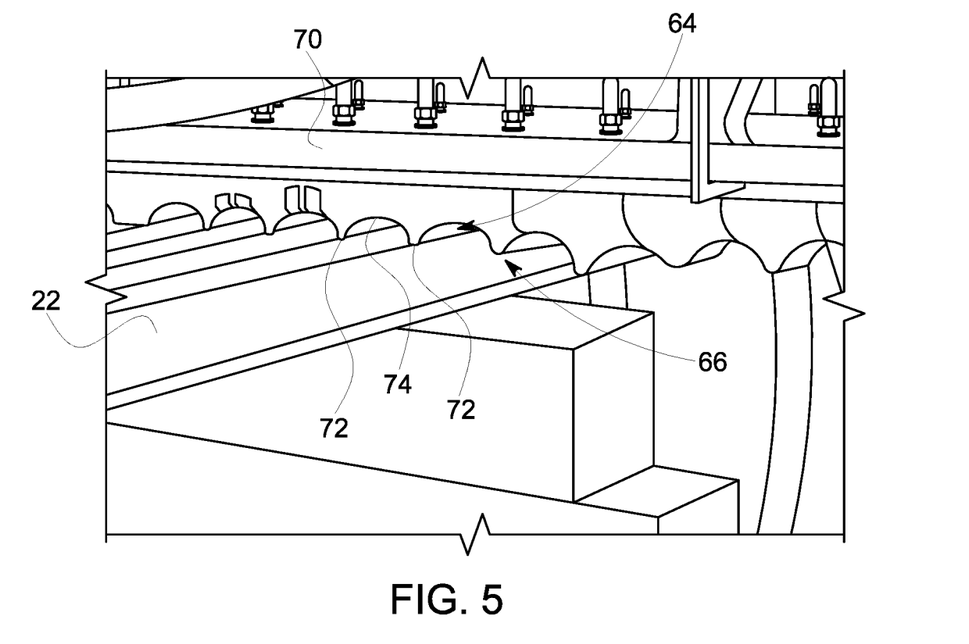
FIG. 5 is another diagram of the shaped inductive heater of FIG. 4.

Accordingly, and as illustrated in FIGS. 4 and 5, in order to improve uniformity, efficiency, control, and/or precision of the heat generated within the tubes 22 via magnetic induction, in embodiments, the heating inductor (34 FIG. 3) may be a shaped inductive heater (70 in FIGS. 4 and 5). In such embodiments, the shaped inductive heater 70 conforms to the shape of the tubes 22 such that tube gap 64 and/or the air gap 66 is reduced when compared to a straight bar inductor. For example, the shaped inductive heater 70 may include one or more raised portions 72 and one or more wells 74. As best seen in FIG. 4, in embodiments, the wells 74 may have a square, circular, or other shaped profile, and may further have a max chord 76, i.e., the longest cord across the profile of a well 74 from raised portion 72 to raised portion 72, and/or a radius 78.

As further illustrated in FIGS. 4 and 5, in embodiments the raised portions 72 and/or the wells 74 may be arranged such that they matchingly align with the valleys 58 and/or the peaks 56, respectively. As used herein, the terms "matchingly align", "matchingly alining", and "matching alignment" mean that the raised portions 72 and the wells 74 are generally arranged over the valleys 58 and/or the peaks 56, respectively, and as shown by the dashed lines 79 in FIG. 4, such that the profile formed by the shaped inductive heater 70 fits over/around the tubes 22 as shown in FIG. 5. As will be appreciated, in embodiments, the raised portions 72 may be configured to penetrate/extend into the valleys 58, e.g., the tips of the raised portions 72 are below the tips of the peaks 56. In order to increase magnetic coupling between the tubes 22 and the shaped magnetic inductor 70, the raised portions may include and/or be formed from an alloyed magnetic ceramic material.

As will also be appreciated, in embodiments, the raised portions 72 and/or the wells 74 may be mechanically manipulated such that the spacing of the raised portions 72 and/or wells 74 may be adjusted to conform to pipes 22 of various sizes and/or various spacing, i.e., the space between subsequent peaks 56 and valleys 58. For example, in embodiments, the raised portions 72 and/or the wells 74 may be mechanically manipulated/adjusted such that the max cord 76 and/or the radius 78 changes.

Figure 6:
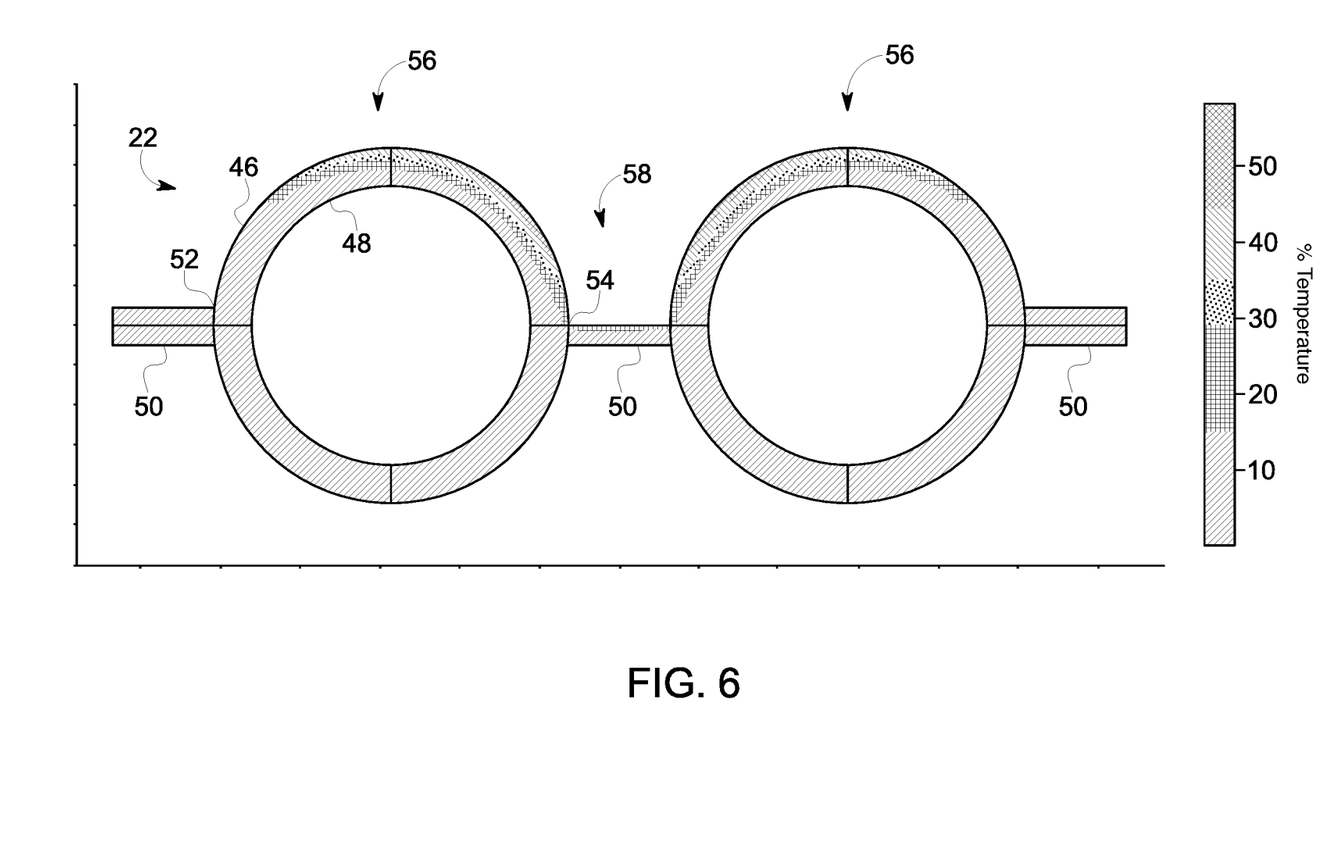
FIG. 6 is a diagram of magnetic flux induced within a waterwall panel via the shaped inductive heater of FIG. 4 in accordance with an embodiment of the invention.
Figure 7:
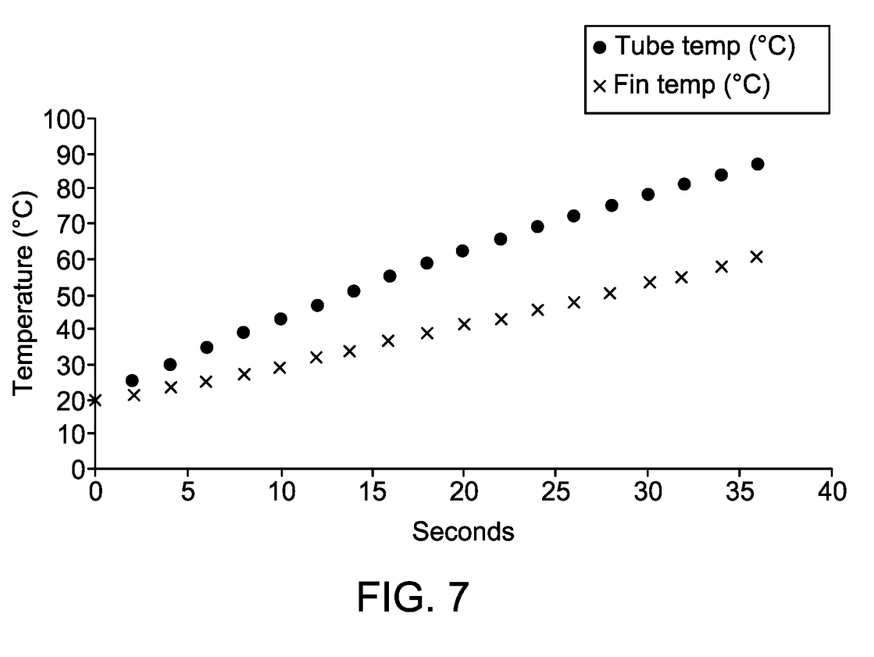
FIG. 7 is a chart that depicts the temperatures over time of the tubes, and fins of the tubes, of a waterwall panel resulting from being heated via the shaped inductive heater of FIG. 4 in accordance with an embodiment of the invention.

Referring now to FIGS. 6 and 7, the magnetic flux induced within the tubes 22/waterwall panel 24 by the shaped inductive heater 70, and the resulting temperatures within the tubes 22, to include the fins 50, are shown. In particular, FIG. 6 depicts the temperature gradient, represented as a temperature percentage, of the tubes 22 and fins 50 resulting from the magnetic flux produced by the shaped inductive heater 70. As will be understood, straight bar inductors, e.g., non-shaped inductive heaters, typically produce a uniform/flat magnetic field which may result in non-uniform heating of the tubes 22, i.e., the peaks 56 of the tubes 22 are heated at a greater intensity than the valleys 58/fins 50. As shown in FIGS. 6 and 7, the shaped inductive heater 70, however, produces a shaped magnetic field (FIG. 6), which in turn results in a more uniform heating of the tubes 22 (shown in FIG. 7 by the close tracking of the "fin temperature", e.g., the temperature of the valleys 58, to the "tube temperature", e.g., the temperature of the tubes 22 in the regions between the internal 48 and the external 46 diameters). Thus, as can be seen in FIG. 7, in embodiments, the shaped inductive heater 70 reduces the difference in heating intensities between the peaks 56 and the valleys 58 compared to a straight bar inductor. In other words, embodiments of the shaped inductive heater 70 focus electromagnetic flux onto an object, e.g., panel 24 having a shape defined by the tubes 22 and fins 50, such that the shape of the induced magnetic flux/magnetic field better conforms to the shape of the object being heated.

Figure 8:
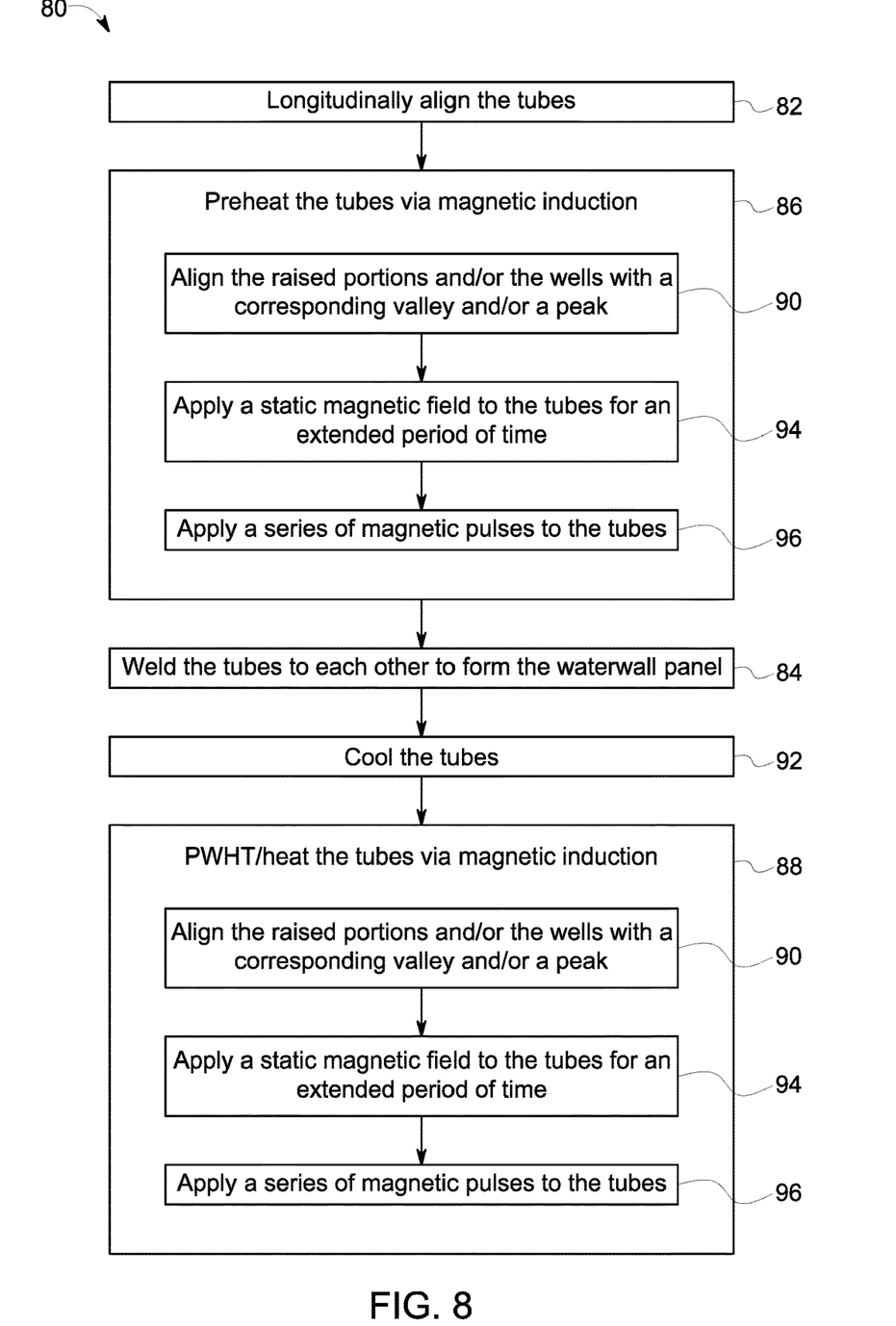
FIG. 8 is a flow chart depicting a method for welding a plurality of tubes together to form a waterwall panel utilizing the heating system of FIG. 1 in accordance with an embodiment of the invention.

Turning to FIG. 8, a method 80 of welding a plurality of tubes 22 together to form a waterwall panel 24 that utilizes the apparatus 10 is shown. As is to be appreciated, in embodiments, the welding application stored in the memory device 42 may be loaded into the at least one processor/CPU 40 such that the controller 38 is further adapted/configured by the heating application to perform all, or part, of method 80. As shown in FIG. 8, the method 80 includes longitudinally aligning 82 the tubes 22, welding 84 the tubes 22 to each other to form the waterwall panel 24, and heating 86 and/or 88 the tubes 22 via magnetic induction. In embodiments, welding 84 the tubes may be synchronized with the speed of the assembly line/conveyor 26.

As is to be appreciated, in embodiments, heating 86/88 the tubes 22 via magnetic induction may preheat 86 the tubes 22 before the tubes 22 are welded together to form the waterwall panel 24, and/or PWHT 88 the tubes 22. In embodiments, heating 86/88 the tubes may include aligning 90 the raised portions 72 and/or the wells 74 with a corresponding valley 58 and/or a peak 56, respectively.

In embodiments, the method 86 may further include cooling 92 the tubes 22 prior to PWHT 88. For example, the welding apparatus 10 may include one or more cooling devices, e.g., fans, blowers, and/or other suitable cooling devices, configured to cool the tubes 22 to a martensitic transformation finish temperature prior to undergoing PWHT 88.

As further shown in FIG. 8, heating 86/88 the tubes 22 via magnetic induction may include applying 94 a static magnetic field to the tubes 22 for an extended period of time; and/or applying 96 a series of magnetic pulses to the tubes 22.

It is to be further understood that the apparatus 10 may include the necessary electronics, software, memory, storage, databases, firmware, logic/state machines, microprocessors, communication links, displays or other visual or audio user interfaces, printing devices, and any other input/output interfaces to perform the functions described herein and/or to achieve the results described herein. For example, as previously mentioned, the apparatus 10 may include at least one processor 40, and system memory 42, which may include random access memory (RAM) and read-only memory (ROM). The apparatus 10 may further include an input/output controller, and one or more data storage structures. All of these latter elements may be in communication with the at least one processor 40 to facilitate the operation of the apparatus 10 as discussed above. Suitable computer program code may be provided for executing numerous functions, including those discussed above in connection with the apparatus 10 and method 80 disclosed herein. The computer program code may also include program elements such as an operating system, a database management system and "device drivers" that allow the apparatus 10, to interface with computer peripheral devices, e.g., sensors, a video display, a keyboard, a computer mouse, etc.

The at least one processor 40 of the apparatus 10 may include one or more conventional microprocessors and one or more supplementary co-processors such as math co-processors or the like. Elements in communication with each other need not be continually signaling or transmitting to each other. On the contrary, such elements may transmit to each other as necessary, may refrain from exchanging data at certain times, and may cause several steps to be performed to establish a communication link therebetween.

The data storage structures such as memory discussed herein may include an appropriate combination of magnetic, optical and/or semiconductor memory, and may include, for example, RAM, ROM, flash drive, an optical disc such as a compact disc and/or a hard disk or drive. The data storage structures may store, for example, information required by the apparatus 10 and/or one or more programs, e.g., computer program code such as the welding application stored in memory device 42 and/or other computer program product, adapted to direct the apparatus 10. The programs may be stored, for example, in a compressed, an uncompiled and/or an encrypted format, and may include computer program code. The instructions of the computer program code may be read into a main memory of a processor from a computer-readable medium. While execution of sequences of instructions in the program causes the processor to perform the process steps described herein, hard-wired circuitry may be used in place of, or in combination with, software instructions for implementation of the processes of the present invention. Thus, embodiments of the present invention are not limited to any specific combination of hardware and software.

The program may also be implemented in programmable hardware devices such as field programmable gate arrays, programmable array logic, programmable logic devices or the like. Programs may also be implemented in software for execution by various types of computer processors. A program of executable code may, for instance, include one or more physical or logical blocks of computer instructions, which may, for instance, be organized as an object, procedure, process or function. Nevertheless, the executables of an identified program need not be physically located together, but may include separate instructions stored in different locations which, when joined logically together, form the program and achieve the stated purpose for the programs such as preserving privacy by executing the plurality of random operations. In an embodiment, an application of executable code may be a compilation of many instructions, and may even be distributed over several different code partitions or segments, among different programs, and across several devices.

The term "computer-readable medium" as used herein refers to any medium that provides or participates in providing instructions to at least one processor 40 of the apparatus 10 (or any other processor of a device described herein) for execution. Such a medium may take many forms, including but not limited to, non-volatile media and volatile media. Non-volatile media include, for example, optical, magnetic, or opto-magnetic disks, such as memory. Volatile media include dynamic random access memory (DRAM), which typically constitutes the main memory. Common forms of computer-readable media include, for example, a floppy disk, a flexible disk, hard disk, magnetic tape, any other magnetic medium, a CD-ROM, DVD, any other optical medium, a RAM, a PROM, an EPROM or EEPROM (electronically erasable programmable read-only memory), a FLASH-EEPROM, any other memory chip or cartridge, or any other medium from which a computer can read.

Various forms of computer readable media may be involved in carrying one or more sequences of one or more instructions to at least one processor for execution. For example, the instructions may initially be borne on a magnetic disk of a remote computer (not shown). The remote computer can load the instructions into its dynamic memory and send the instructions over an Ethernet connection, cable line, or telephone line using a modem. A communications device local to a computing device, e.g., a server, can receive the data on the respective communications line and place the data on a system bus for at least one processor. The system bus carries the data to main memory, from which the at least one processor retrieves and executes the instructions. The instructions received by main memory may optionally be stored in memory either before or after execution by the at least one processor. In addition, instructions may be received via a communication port as electrical, electromagnetic or optical signals, which are exemplary forms of wireless communications or data streams that carry various types of information.

It is further to be understood that the above description is intended to be illustrative, and not restrictive. For example, the above-described embodiments (and/or aspects thereof) may be used in combination with each other. Additionally, many modifications may be made to adapt a particular situation or material to the teachings of the invention without departing from its scope.

For example, in an embodiment, a waterwall panel welding apparatus is provided. The apparatus includes an inlet assembly, a welding assembly, an outlet assembly, and a heating system. The inlet assembly is for receiving a plurality of tubes. The welding assembly is for receiving the tubes from the inlet assembly and for allowing the tubes to be welded together to form a waterwall panel. The outlet assembly is for receiving the waterwall panel from the welding assembly. The heating system heats the tubes and operates via magnetic induction. In certain embodiments, the heating system includes at least one shaped inductive heater that conforms to a shape of the tubes. In certain embodiments, the tubes include one or more fins that define one or more valleys when the tubes are aligned longitudinally adjacent to each other, the shape is defined by the valleys; and the shaped inductive heater includes one or more raised portions for matchingly aligning with the valleys. In certain embodiments, the one or more raised portions comprise of an alloyed magnetic ceramic material. In certain embodiments, the heating system is disposed in the inlet assembly and preheats the tubes before the tubes are welded together to form the waterwall panel. In certain embodiments, the heating system is disposed in the outlet assembly and post weld heat treats the tubes. In certain embodiments, the waterwall panel welding apparatus is of a twelve torch, four torch, or gantry design.

Other embodiments provide for a method of welding a plurality of tubes together to form a waterwall panel. The method includes: longitudinally aligning the tubes; welding the tubes to each other to form the waterwall panel; and heating the one or more tubes via magnetic induction. In certain embodiments, heating the one or more tubes via magnetic induction includes aligning one or more raised portions of a shaped inductive heater such that each raised portion matches with a corresponding valley defined by one or more fins of the tubes. In certain embodiments, heating the one or more tubes via magnetic induction preheats the tubes before the tubes are welded together to form the waterwall panel. In certain embodiments, heating the one or more tubes via magnetic induction post weld heat treats the tubes. In certain embodiments, heating the one or more tubes via magnetic induction to post weld heat treat the tubes is performed on a welding apparatus. In certain embodiments, the method further includes cooling the tubes. In certain embodiments, heating the one or more tubes via magnetic induction includes applying a static magnetic field to the tubes for an extended period of time. In certain embodiments, heating the one or more tubes via magnetic induction includes applying a series of magnetic pulses to the tubes. In certain embodiments, heating the one or more tubes via magnetic induction includes utilizing an alternating current that has at least one of a high-frequency that heats one or more near-surface regions of the tubes, and a low-frequency that heats one or more deep regions of the tubes.

Yet still other embodiments provide for a shaped inductive heater for heating one or more fins of a plurality of tubes used to form a waterwall. The shaped inductive heater includes one or more raised portions and one or more wells for matchingly aligning with one or more valleys and one or more peaks of the tubes, respectively. The valleys are defined by the fins and the peaks are defined by one or more outer diameters of the tubes. The tubes are welded together via the fins to form the waterwall panel, and the shaped inductive heater heats the fins via magnetic induction. In certain embodiments, the raised portions comprise of an alloyed magnetic ceramic material. In certain embodiments, the raised portions extend into the valleys when the one or more raised portions and the one or more wells are matchingly aligned with the one or more valleys and the one or more peaks of the tubes, respectively. In certain embodiments, the shaped inductive heater at least one of preheats the fins before the fins are welded together to form the waterwall panel from the tubes, and post weld heat treats the fins.

Accordingly, as is to be appreciated, by utilizing magnetic induction to heat, some embodiments of the invention heat the tubes of a waterwall panel internally, i.e., from the inside out, as opposed to contact surface heaters, e.g., resistances heaters and/or gas torches, which heat externally, i.e., from the outside in. Thus, some embodiments of the invention provide for more uniform heating of tubes and/or other similar shaped components. Moreover, by heating from the inside out, some embodiments provide for the ability to PWHT a newly welded waterwall panel on the outlet assembly, thus avoiding the need to transfer the panel to a baking oven. Accordingly, not only do such embodiments reduce the amount of handling, and therefore the risk of a waterwall panel cracking, but also decrease the production cycle time of individual waterwall panels. Moreover, the wiring required to power the inductive heaters of some embodiments may be dramatically less than the piping and ducting required for other types of heaters, such as gas torches.

Additionally, in some embodiments, the power supply may be 92% efficient and the heating inductor may be 80% or more efficient. Thus, some embodiments may only require a 40-amp line to produce 25 kW of power.

Further still, some embodiments provide that the heating inductor does not itself become excessively hot. Thus, such embodiments may provide for increased operational safety over conventional contact heaters, avoid contamination of the welded components resulting from atoms of the such contact heaters adhering to the welded material, and/or reduce the amount of dust generated due to vaporization of insulation blankets and/or other materials.

Moreover, the inductive heaters of some embodiments may heat the tubes up to four times faster than traditional contact heaters, thus providing for further reductions in the cycle production time of individual panels.

As is to be appreciated, while the dimensions and types of materials described herein are intended to define the parameters of the invention, they are by no means limiting and are exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, terms such as "first," "second," "third," "upper," "lower," "bottom," "top," etc. are used merely as labels, and are not intended to impose numerical or positional requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose several embodiments of the invention, including the best mode, and also to enable one of ordinary skill in the art to practice the embodiments of invention, including making and using any devices or systems and performing any incorporated methods. The patentable scope of the invention is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the above-described invention, without departing from the spirit and scope of the invention herein involved, it is intended that all of the subject matter of the above description shown in the accompanying drawings shall be interpreted merely as examples illustrating the inventive concept herein and shall not be construed as limiting the invention.

What is claimed is:

1. A shaped inductive heater for heating one or more fins of a plurality of tubes used to form a waterwall panel, the shaped inductive heater comprising:
   one or more raised portions and one or more wells configured to matchingly align with one or more valleys and one or more peaks of the tubes, respectively, the valleys defined by the fins and the peaks defined by one or more outer diameters of the tubes, wherein each of the one or more wells has a first curved surface corresponding to a second curved surface at a peak of the one or more peaks of the tubes, wherein the first curved surface has a radius of curvature extending between adjacent raised portions of the one or more raised portions; and
   wherein the tubes are welded together via the fins to form the waterwall panel, and
   the shaped inductive heater heats the fins via magnetic induction.

2. The shaped inductive heater of claim 1, wherein the raised portions comprise an alloyed magnetic ceramic material.

3. The shaped inductive heater of claim 1, wherein the raised portions extend into the valleys when the one or more raised portions and the one or more wells are matchingly aligned with the one or more valleys and the one or more peaks of the tubes, respectively.

4. The shaped inductive heater of claim 1, wherein the shaped inductive heater comprises a controller configured to control at least one of preheating prior to welding of the fins to form the waterwall panel from the tubes, or post weld heat treating after the welding of the fins to form the waterwall panel from the tubes.

5. The shaped inductive heater of claim 1, wherein the radius of curvature changes.

6. The shaped inductive heater of claim 1, wherein the first curved surface is configured to conform to the second curved surface.

7. The shaped inductive heater of claim 1, wherein the shaped inductive heater is configured to enable lateral adjustment of the one or more raised portions, or one or more wells, or a combination thereof, based on a geometry or spacing of the plurality of tubes.

8. The shaped inductive heater of claim 1, wherein the shaped inductive heater is configured to enable adjustment of a first spacing between adjacent raised portions of the one or more raised portions, or a second spacing between adjacent wells of the one or more wells, or a combination thereof.

9. The shaped inductive heater of claim 1, wherein the shaped inductive heater is configured to enable adjustment of a depth or intensity of the heating via an adjustment of a tube gap between the one or more wells and the one or more peaks of the tubes, an adjustment of an air gap between the one or more raised portions and the one or more valleys, or a combination thereof.

10. The shaped inductive heater of claim 1, wherein the shaped inductive heater comprises a static mode and a pulsed mode, the static mode is configured to apply a static magnetic field, and the pulsed mode is configured to apply a series of magnetic pulses.

11. The shaped inductive heater of claim 1, comprising a controller and at least one sensor, the at least one sensor is configured to monitor a temperature of the tubes, and the controller is configured to control the heating by the shaped inductive heater to facilitate a welding process by a welding assembly.

12. The shaped inductive heater of claim 1, wherein the first curved surface extends an entire distance between, and directly to, the adjacent raised portions of the one or more raised portions.

13. A shaped inductive heater for heating one or more fins of a plurality of tubes used to form a waterwall panel, the shaped inductive heater comprising:
one or more raised portions and one or more wells configured to matchingly align with one or more valleys and one or more peaks of the tubes, respectively, the valleys defined by the fins and the peaks defined by one or more outer diameters of the tubes, wherein each of the one or more wells has a first curved surface corresponding to a second curved surface at a peak of the one or more peaks of the tubes, wherein the first curved surface is configured to conform to the second curved surface; and
wherein the tubes are welded together via the fins to form the waterwall panel, and
the shaped inductive heater heats the fins via magnetic induction.

14. The shaped inductive heater of claim 13, wherein the shaped inductive heater is configured to enable adjustment of a first spacing between adjacent raised portions of the one or more raised portions, or a second spacing between adjacent wells of the one or more wells, or a combination thereof.

15. The shaped inductive heater of claim 13, wherein the first curved surface extends between adjacent raised portions of the one or more raised portions.

16. The shaped inductive heater of claim 15, wherein the first curved surface extends an entire distance between, and directly to, the adjacent raised portions of the one or more raised portions.

17. A shaped inductive heater for heating one or more fins of a plurality of tubes used to form a waterwall panel, the shaped inductive heater comprising:
one or more raised portions and one or more wells configured to matchingly align with one or more valleys and one or more peaks of the tubes, respectively, the valleys defined by the fins and the peaks defined by one or more outer diameters of the tubes, wherein each of the one or more wells has a first curved surface corresponding to a second curved surface at a peak of the one or more peaks of the tubes, wherein the shaped inductive heater is configured to enable adjustment of a first spacing between adjacent raised portions of the one or more raised portions, or a second spacing between adjacent wells of the one or more wells, or a combination thereof; and
wherein the tubes are welded together via the fins to form the waterwall panel, and
the shaped inductive heater heats the fins via magnetic induction.

18. The shaped inductive heater of claim 17, wherein the first curved surface has a radius of curvature that changes.

19. The shaped inductive heater of claim 17, wherein the first curved surface extends between adjacent raised portions of the one or more raised portions.

20. The shaped inductive heater of claim 19, wherein the first curved surface extends an entire distance between, and directly to, the adjacent raised portions of the one or more raised portions.

* * * * *